US008923185B2

(12) United States Patent
Martinez et al.

(10) Patent No.: US 8,923,185 B2
(45) Date of Patent: Dec. 30, 2014

(54) METHOD FOR ENHANCING THE RELIABILITY OF THE CONTINUITY OF THE COMMUNICATIONS OPERATED FROM A 4G MOBILE TERMINAL LINKED TO AN IP INTERCONNECTION NETWORK

(71) Applicant: Thales, Neuilly-sur-Seine (FR)

(72) Inventors: Natael Martinez, Velizy (FR); Christophe Mathieu, Velizy (FR); Guillaume Klech, Velizy (FR)

(73) Assignee: Thales, Neuilly sur Seine (FR)

( * ) Notice: Subject to any disclaimer, the term of this patent is extended or adjusted under 35 U.S.C. 154(b) by 149 days.

(21) Appl. No.: 13/627,830

(22) Filed: Sep. 26, 2012

(65) Prior Publication Data

US 2013/0083716 A1    Apr. 4, 2013

(30) Foreign Application Priority Data

Sep. 30, 2011    (FR) ...................................... 11 02965

(51) Int. Cl.
*H04H 20/71* (2008.01)
*H04W 8/08* (2009.01)
*H04W 80/04* (2009.01)
*H04W 24/04* (2009.01)

(52) U.S. Cl.
CPC .............. *H04W 8/085* (2013.01); *H04W 80/04* (2013.01); *H04W 24/04* (2013.01)
USPC .......................................... 370/312; 370/401

(58) Field of Classification Search
None
See application file for complete search history.

(56) References Cited

U.S. PATENT DOCUMENTS

2010/0061226 A1*   3/2010   Morishige et al. ............ 370/216

2010/0177685 A1*   7/2010   Aggarwal ...................... 370/328
2014/0169268 A1*   6/2014   Hampel et al. ................ 370/328

FOREIGN PATENT DOCUMENTS

EP    2071807 A1    6/2009
FR    2953357 A1    6/2011

OTHER PUBLICATIONS

Toru Otsu, et al., "Network Architecture for Mobile Communications System Beyond IMT-2000", IEEE Personal Communications, Oct. 2001, pp. 31-37, vol. 8, No. 5, XP-011092130.
Alan O'Neill, et al., "Routing and Handoff in the Edge Mobility Architecture", Mobile Computing and Communications Review, Oct. 1, 2000, pp. 54-66, vol. 4, No. 4, XP-002433342.
Ramachandran Ramjee, et al. "Hawaii: A Domain-Based Appoach for Supporting Mobility in Wide-Area Wireless Networks", ACM Transactions on Networking, Jun. 2002, pp. 396-410, vol. 10, No. 3, XP-011077170.

* cited by examiner

*Primary Examiner* — Ian N Moore
*Assistant Examiner* — Eric P Smith
(74) *Attorney, Agent, or Firm* — Baker & Hostetler LLP

(57) ABSTRACT

A method for guaranteeing with a high level of reliability the continuity of the communications operated from a fourth-generation mobile terminal linked to a level-3 interconnection network, in the terminology defined by the OSI, uses gateways to maintain location information about the mobile terminals. The method applies notably to the mobility of mobile terminals in a context which is highly intolerant to faults, for example for networks used by military forces, public bodies, or civil agents such as the police, fire brigade or civil security. In particular, it may be implemented in networks liable to experience breaks in communication links in the interconnection network.

8 Claims, 3 Drawing Sheets

METHOD FOR ENHANCING THE RELIABILITY OF THE CONTINUITY OF THE COMMUNICATIONS OPERATED FROM A 4G MOBILE TERMINAL LINKED TO AN IP INTERCONNECTION NETWORK

CROSS-REFERENCE TO RELATED APPLICATION

This application claims priority to foreign French patent application No. FR 1102965, filed on Sep. 30, 2011, the disclosure of which is incorporated by reference in its entirety.

FIELD OF THE INVENTION

The present invention relates to a method for guaranteeing with a high level of reliability the continuity of the communications operated from a fourth-generation (4G) mobile terminal linked to a level-3 interconnection network, in the terminology defined by the OSI ("Open Systems Interconnection"). The invention applies notably to the mobility of mobile terminals in a context which is highly intolerant to faults, for example for networks used by military forces, public bodies, or civil agents such as the police, fire brigade or civil security. In particular, the invention may be implemented in networks liable to experience breaks in communication links in the interconnection network.

BACKGROUND

The computerized networks used by fourth-generation (4G) mobile terminals comprise radio sub-networks, sometimes designated by the initials RAN for "Radio Access Network", which are hooked up to an interconnection network, also called a CSN ("Connectivity Service Network"), the CSN being linkable to the Internet. A fourth-generation mobile terminal is identified by an IP ("Internet Protocol") address which allows it to receive and to send data across the whole of the computerized network. The mobile terminal is under the coverage of an antennal station, also called a base station. A RAN is formed of a set of base stations whose coverages supplement one another so as to cover a territory. Between the mobile terminal and the base station, the data are transmitted in the form of radioelectric waves and then the base station transmits the data, generally via optical fibers or cables, to a gateway interfacing between a RAN and a CSN. As a general rule, several base stations are controlled by one and the same control station. Such a control station fulfills several roles, notably the filtering of packets, the management of service quality, the authentication of users, the control of the base stations.

When the mobile terminal moves and exits the zone covered by a first base station under the coverage of which it was situated, the communications are ensured by a second base station whose coverage is adjacent to the first. If the second base station is connected to the same control station as the first base station, one speaks of micro-mobility. In the case where the mobile terminal moves to a second base station which is connected to a control station different from the first control station, the term macro-mobility is employed. The present invention deals more particularly with problems of continuity of communications within the framework of the macro-mobility of mobile terminals.

A protocol, called MIP for "Mobile IP", is known for managing the macro-mobility of mobile terminals on WiMax networks. MIP relies on the HA ("Home Agent") and FA ("Foreign Agent") functions which are software modules executed by routers at the level of the IP network layer (layer 3). The HA function makes it possible to receive and to steer data packets intended for the mobile terminal, including when the latter leaves its initial gateway. The FA function is executed by a router for relaying the data packets up to the mobile terminal. The HA function is an anchoring point for the mobile terminal in the CSN and this anchoring point persists as long as the mobile terminal is under the coverage of a RAN, whatever the base station to which it is connected. The HA function is generally executed by a single router of the CSN and thus constitutes a significant point of weakness. Hence, if a movement of the mobile terminal entails a change of control station, and if the router executing the HA function is not reachable from the new gateway—for example, if several communication links are cut—, the communication may not be maintained, despite the optional duplication mechanisms implemented. Hence, although the MIP protocol can constitute a solution in a centralized environment, it is not suited to networks with strong reliability constraints, such as for example private mobile radio or PMR.

A technique described in the French application published under the number FR2953357 has already been proposed for solving the problems of macro-mobility in a context of high reliability. However, this technique is less optimized when the interconnection network operates at the level of the IP layer, that is to say when the network uses IP routers rather than level-2 Ethernet switches.

SUMMARY OF THE INVENTION

An aim of the invention is to propose a reliable method for ensuring the continuity of communication of a mobile terminal moving around in a network comprising control stations linked by an interconnection network operating at the level of layer 3 of the ISO model. For this purpose, the subject of the invention is a method for guaranteeing the continuity of the communications operated from a fourth-generation mobile terminal connected to a radio network provided with several base stations with which said terminal is able to communicate, a base station being affiliated to a controller from among several controllers linking said radio network to an interconnection network comprising routers operating at the level of the IP layer, at least one controller being connected to at least one gateway configured to encapsulate in IP packets all the IP packets arising from the radio network before broadcasting them over the interconnection network, the method comprising at least the following steps:

when a mobile terminal connects to a base station affiliated to a controller to which the mobile terminal was not affiliated hitherto, said controller transmits to a gateway a level-2 message comprising at least the IP address of the mobile terminal, said gateway creates, at the level of the IP layer, a message comprising the IP address of said mobile terminal and the IP address of said gateway in the interconnection network, said IP message is broadcast by said gateway to destination gateways associated with the other controllers, each of said destination gateways storing a correspondence between the IP address of the mobile terminal and the IP address of the sending gateway associated with the controller to which the mobile terminal is affiliated.

The method according to the invention makes it possible to permanently update the mobility management function, which is distributed throughout the network. Thus, if a control station becomes defective, only the sub-network of radio stations becomes inoperative, the other sub-networks of radio stations not being affected due to the fact that the mobility management function is ensured by each controller independently of one another. According to one embodiment, the level-2 message sent by the controller comprises a correspondence between the IP address of the mobile terminal and the level-2 address of said controller.

According to an implementation of the method according to the invention, the gateways are accessible through at least two different IP addresses, a first IP address being known to the nodes of the radio network, a second IP address being known to the nodes of the interconnection network, in which all the IP packets arising from a controller are systematically transmitted to the gateway with which it is associated, said gateway encapsulating said IP packets in other IP packets whose destination IP address is the second address of a destination gateway.

Thus in a communication between two mobile terminals each connected to a different base station, the stations being affiliated to different controllers, all the IP data packets transmitted by the first mobile terminal are encapsulated by IP packets of higher level in the gateway associated with the first controller, these IP packets of higher level being transmitted to the gateway associated with the controller to which the second mobile terminal is affiliated. The IP packets are thereafter de-encapsulated, in such a way that the gateway associated with the second controller transmits the initial IP packets to the second controller, and then to the second mobile terminal.

According to an implementation of the method according to the invention, each controller is connected to a gateway specific to this controller. This gateway makes it possible at one and the same time to ensure the function for signaling the mobility of the mobile terminals, and also the function for guiding the IP data traveling through the interconnection network.

According to an implementation of the method according to the invention, each gateway is connected to the controller at which it is located by way of at least one IP router included in the interconnection network, said router being configured to systematically guide all the IP packets or level-2 messages to said gateway, prior to their encapsulation and broadcasting in the interconnection network.

According to an implementation of the method according to the invention, after the encapsulation step, all the packets arising from a first gateway connected to a first controller travel via the interconnection network and are then transmitted to a second gateway connected to a second controller, this second gateway removing the IP capsule added to the IP packets by the first gateway before transmitting said IP packets to the second controller.

According to an implementation of the method according to the invention, the first IP address known to the nodes of the radio network is the same for all the gateways. The presence of these two IP addresses allows the mobile terminal to keep just a single IP address.

According to an implementation of the method according to the invention, when a router sends an ARP request to the interconnection network, the first router of the interconnection network receiving said request transmits it to a gateway, said gateway transmitting a response to said router, the response comprising the level-2 address of said gateway.

The subject of the invention is also a system for guaranteeing the continuity of the communications operated from a fourth-generation mobile terminal connected to a radio network provided with several base stations with which said terminal is able to communicate, said radio network being linked by controllers to an interconnection network comprising routers operating at the level of the IP layer, wherein each controller is connected to at least one gateway configured to encapsulate in IP packets all the IP packets arising from the radio network before broadcasting them over the interconnection network.

According to one embodiment of the system according to the invention, at least one gateway is connected via a data bus to the controller with which it is associated.

According to one embodiment of the system according to the invention, at least one gateway is connected by way of at least one router to the controller with which it is associated.

BRIEF DESCRIPTION OF THE DRAWINGS

Other characteristics will become apparent on reading the nonlimiting detailed description given by way of example which follows in relation to appended drawings which represent.

DETAILED DESCRIPTION

Figure 1:
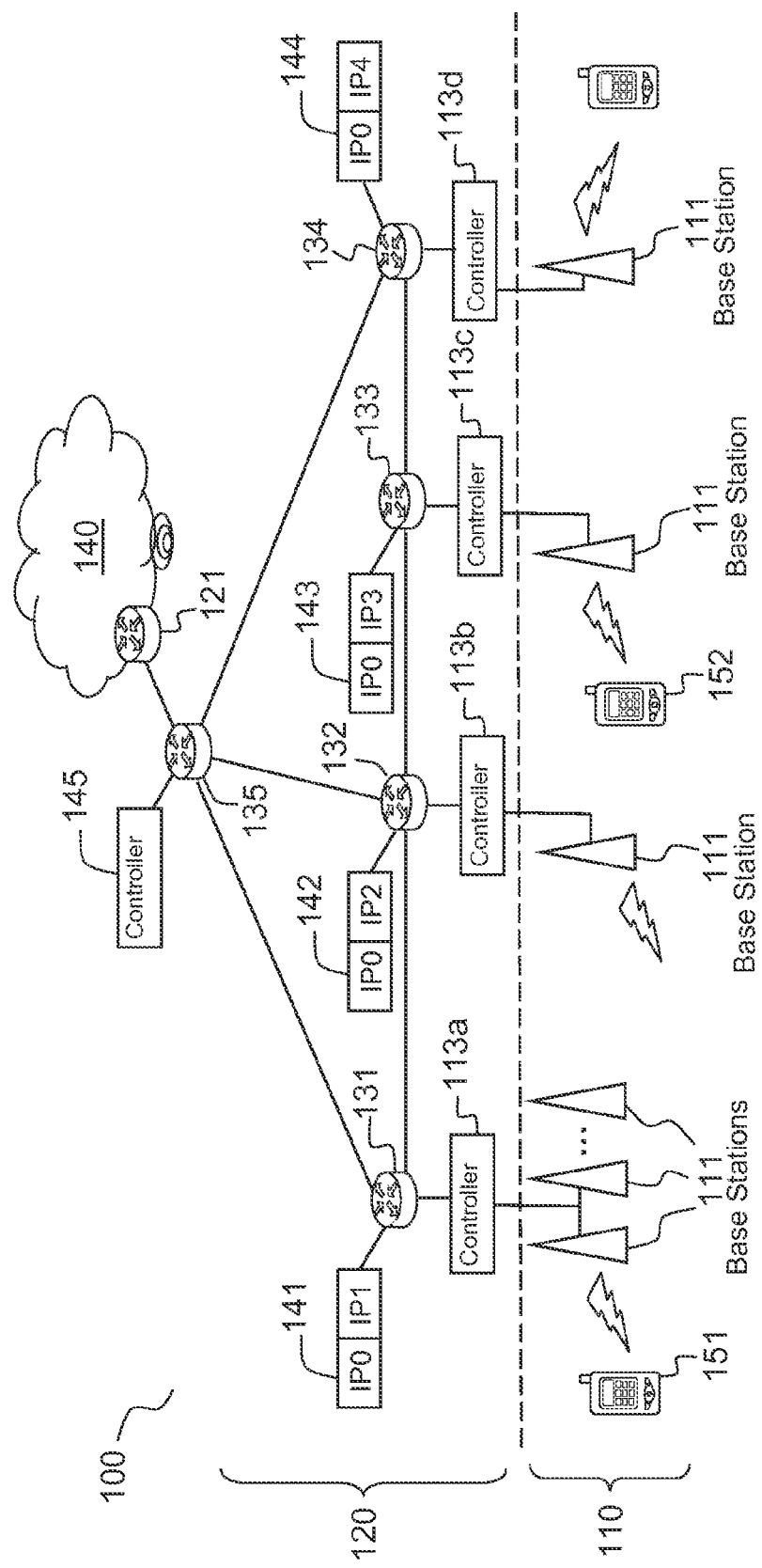
FIG. 1, a diagram presenting an exemplary network on which the method according to the invention may be implemented.

FIG. 1 is a view presenting an exemplary network on which the method according to the invention may be implemented. A 4 G communications network 100 comprises a radio network 110 called a RAN subsequently, and an interconnection network 120 formed, for example, of cabled communications links or RF beam radio links or the like. In the example, the interconnection network 120 is linked to the Internet network 140 by way of a router 121. The RAN 110 comprises several radio base stations 111 spread out to cover a territory. Thus, the 4 G communications network 100 allows mobile terminals 151 present in this territory to communicate with other terminals 152 connected to the 4 G network 100 via other base stations. A mobile terminal 151, 152 is, for example, a telephone, a laptop computer or any other roaming apparatus able to communicate via the 4 G network 100.

Several radio base station controllers 113*a*, 113*b*, 113*c*, 113*d*, also called more simply "controllers" subsequently, make it possible notably to manage the problems of macro-mobility of the mobile terminals, service quality, and authentication of users. Each of these controllers 113*a*, 113*b*, 113*c*, 113*d* controls one or more radio base stations 111. The functions traditionally allotted to the "Home agent" in the case of the use of the MIP (Mobile IP) protocol are, within the framework of the invention, distributed at the level of the base controllers 113*a*, 113*b*, 113*c*, notably so as to avoid the vulnerability of a centralized system. Furthermore, the controllers 113*a*, 113*b*, 113*c*, 113*d* are linked together by a network of routers 131, 132, 133, 134, 135 operating at the level of the IP layer.

Hence, when a new mobile terminal 151 connects to a base station 111 affiliated to a controller 113*a* to which this terminal 151 was not hitherto affiliated—stated otherwise, the mobile terminal was not connected to a base station affiliated to this controller 113*a*—, the other controllers 113*b*, 113*c*, 113*d* must be advised of the arrival of the new mobile terminal 151. In the example, the controller 113*a* is designed to be hooked up to an interconnection network comprising switches operating at level 2 of the ISO layer, although in the invention, this controller is hooked up to a network of routers 131, 132, 133, 134, 135 operating at level 3. The base controller 113*a* to which the new mobile terminal 151 is affiliated is configured to send a message to advise the other controllers 113*b*, 113*c*, 113*d* of the arrival of the mobile terminal 151. According to one mode of implementation of the method according to the invention, the message is of "Gratuitous ARP" or GARP type. This message comprises the IP address of the mobile terminal and the level-2 address of the controller 113*a*, which in the case of an Ethernet network is an MAC address. In the implementation of the invention, the interconnection network 120 being level 3, the network cannot propagate the GARP message automatically to the other controllers 113*b*, 113*c*, 113*d*. To allow the propagation of this message, gateways 141, 142, 143, 144 operating at the level of the IP layer are interfaced between each controller 113*a*, 113*b*, 113*c*, 113*d* and the interconnection network 120. The gateway 141, 142, 143, 144 is accessible to the controller 113*a*, 113*b*, 113*c*, 113*d* via one or more routers 131, 132, 133, 134 of the interconnection network 120. The GARP message sent by the controller 113*a* with which the mobile terminal is newly affiliated is redirected to the gateway 141 which is associated with this controller 113*a*. This level-2 GARP message can thus be processed by the gateway 141 associated with the base controller 113*a* to which the new mobile terminal 151 is affiliated. The gateway 141 utilizes level-2 message to create an IP message so as to alert the other gateways 142, 143, 144 of the arrival of a new mobile terminal 151 at the controller 113*a* associated with this gateway 141. The IP message propagates through the interconnection network 120 so as to reach the other gateways 142, 143, 144, which store a correspondence between the IP address of the mobile terminal and the IP address of the gateway 141 with which the controller 113*a* of the mobile terminal is affiliated. Thus, it is not necessary to directly alert the other controllers 113*b*, 113*c*, 113*d* of the arrival of a new mobile terminal 151 affiliated to the first controller 113*a*. It is the gateways 141, 142, 143, 144 which maintain this information necessary for proper management of the macro-mobility of the terminals 151. In the case of a movement of a mobile terminal, previously affiliated to a first controller, to a base station affiliated to another controller, the correspondence, maintained by each of the gateways 141, 142, 143, 144, between the IP address of the mobile terminal and the IP address of the gateway associated with the controller to which this mobile terminal is affiliated is modified by each of the gateways 141, 142, 143, 144. Indeed, the IP address of the initial gateway is replaced with the IP address of the new gateway. Within this framework, the gateways play a role in signaling the mobility of the terminals.

The mobile terminals 151, 152 connected to the interconnection network 120 via the radio base stations 111 and the controllers 113*a*, 113*b*, 113*c*, 113*d* belong to the same IP sub-network, so that once a mobile terminal has been declared at the 4 G network 100, and an IP address has been allocated to it, this IP address does not change, even in the case of macro-mobility of this terminal.

To allow the mobile terminals to pass from one controller to the other without changing IP address and without disturbing the communications, all the IP data packets transmitted through a controller 113*a*, 113*b*, 113*c*, 113*d* destined for another controller 113*a*, 113*b*, 113*c*, 113*d* are systematically encapsulated in other IP packets so as to be able to be propagated by the routers 131, 132, 133, 134, 135 of the interconnection network 120. A known IP address of the interconnection network 120 is allocated to the IP packets encapsulating the IP data packets, so as to correctly route them up to the destination controller, that is to say up to the controller charged with transmitting the packets to the base station to which the destination mobile terminal is connected. The IP capsule which had been added before routing in the interconnection network is thereafter removed at the level of this destination controller, more exactly by the gateway associated with this destination controller.

This IP in IP encapsulation mechanism is advantageously implemented by a gateway 141, 142, 143, 144 such as described above, a gateway preferably being put in place for each controller 113*a*, 113*b*, 113*c*, 113*d*. A gateway may be viewed, for the processing of IP data, as a means for encapsulating IP packets in other IP packets of higher level. Two IP addresses are allocated to each of the gateways 141, 142, 143, 144: a first IP address viewed from the radio network 110, and a second IP address viewed from the interconnection network 120. The first IP address, viewed from the radio network 110, is always the same, whatever the gateway 141, 142, 143, 144; stated otherwise, all the gateways have the same first IP address, which in FIG. 1 is designated by "IP0". The second IP address, specific to each gateway, allows the addressing of the data within the interconnection network 120.

In the example of FIG. 1, a router 131, 132, 133, 134 is interfaced between each controller 113*a*, 113*b*, 113*c*, 113*d* and the gateway 141, 142, 143, 144 with which it is associated. This router 131, 132, 133, 134 is configured to systematically transfer all the packets received from the controller to which it is connected to the associated gateway. All the packets entering the interconnection network 120 via a controller 113*a*, 113*b*, 113*c*, 113*d* are therefore transmitted to the gateway associated with this controller, so as to perform the IP in IP encapsulation described above.

Advantageously, a gateway 141 is co-located with the router with which it is associated 131. According to one mode of implementation of the method according to the invention, the controller and the gateway are physically integrated into the same machine, the gateway being for example connected to the controller by a network cable or a data bus.

Furthermore, certain gateways 145 of the interconnection network 120 can receive requests of ARP (Address Resolution Protocol) type sent from external routers 121 to this interconnection network 120. These requests originate, for example, from external routers 121 charged with determining which MAC address in the interconnection network 120 is the one which corresponds to a determined IP address. These gateways 145 are configured to respond with their own MAC addresses; stated otherwise, to indicate to the external routers 121 that whatever the specified IP address whose corresponding level-2 party is sought, it is the gateway 145 which must receive all the packets so as to undertake an IP in IP encapsulation such as described above and then steer them to the correct gateways of the network.

Figure 2:
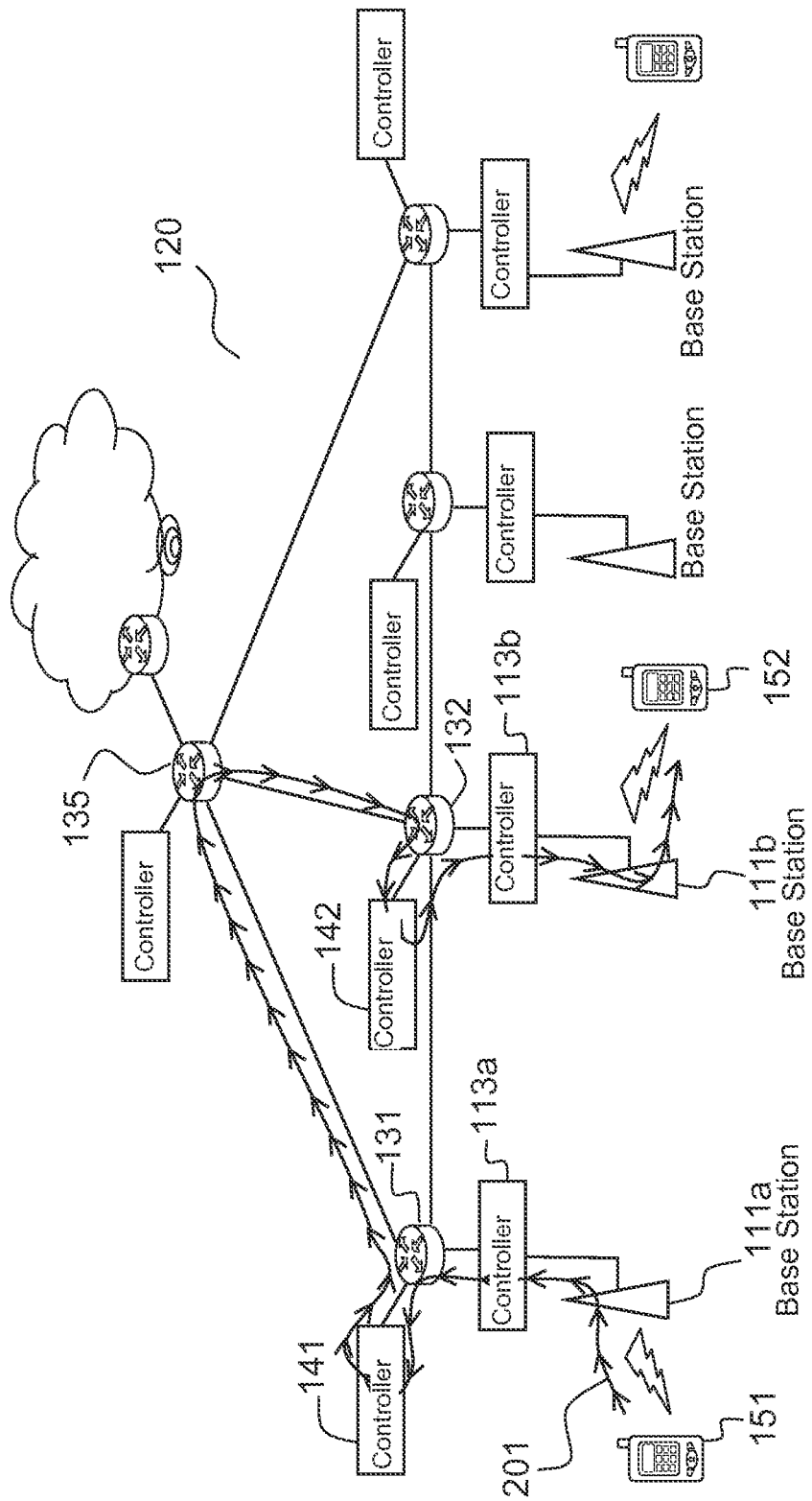
FIG. 2, a diagram illustrating an exemplary path taken by data in a network in which the method according to the invention is implemented.

FIG. 2 illustrates by a diagram an exemplary path taken by data in a network in which the method according to the invention is implemented. The figure illustrates with an arrowed line a path 201 followed by data between a first mobile terminal 151 and a second mobile terminal 152, the mobile terminals 151, 152 having been registered beforehand with the controllers 113*a*, 113*b*.

The IP data arising from the first mobile terminal 151 are transmitted to a base station 111*a*, and then to the first controller 113*a* interfaced with the interconnection network 120. A router 131 of the interconnection network receives the data; it is configured to steer the data packets automatically to the first gateway 141. This gateway 141, which comprises two IP addresses as described above, encapsulates the IP data packets in other IP packets of higher level. The destination IP address in the interconnection network 120 which is allocated to the IP packets of higher level is the IP address of the destination gateway 142 viewed from the interconnection network 120. The IP packets of higher level are thus routed through the interconnection network 120 up to the destination gateway 142, which decodes the previously encapsulated IP data packets, and transmits them to the second controller 113b. The IP data are thereafter transmitted to a base station 111b and then to the second mobile terminal 152.

Figure 3:
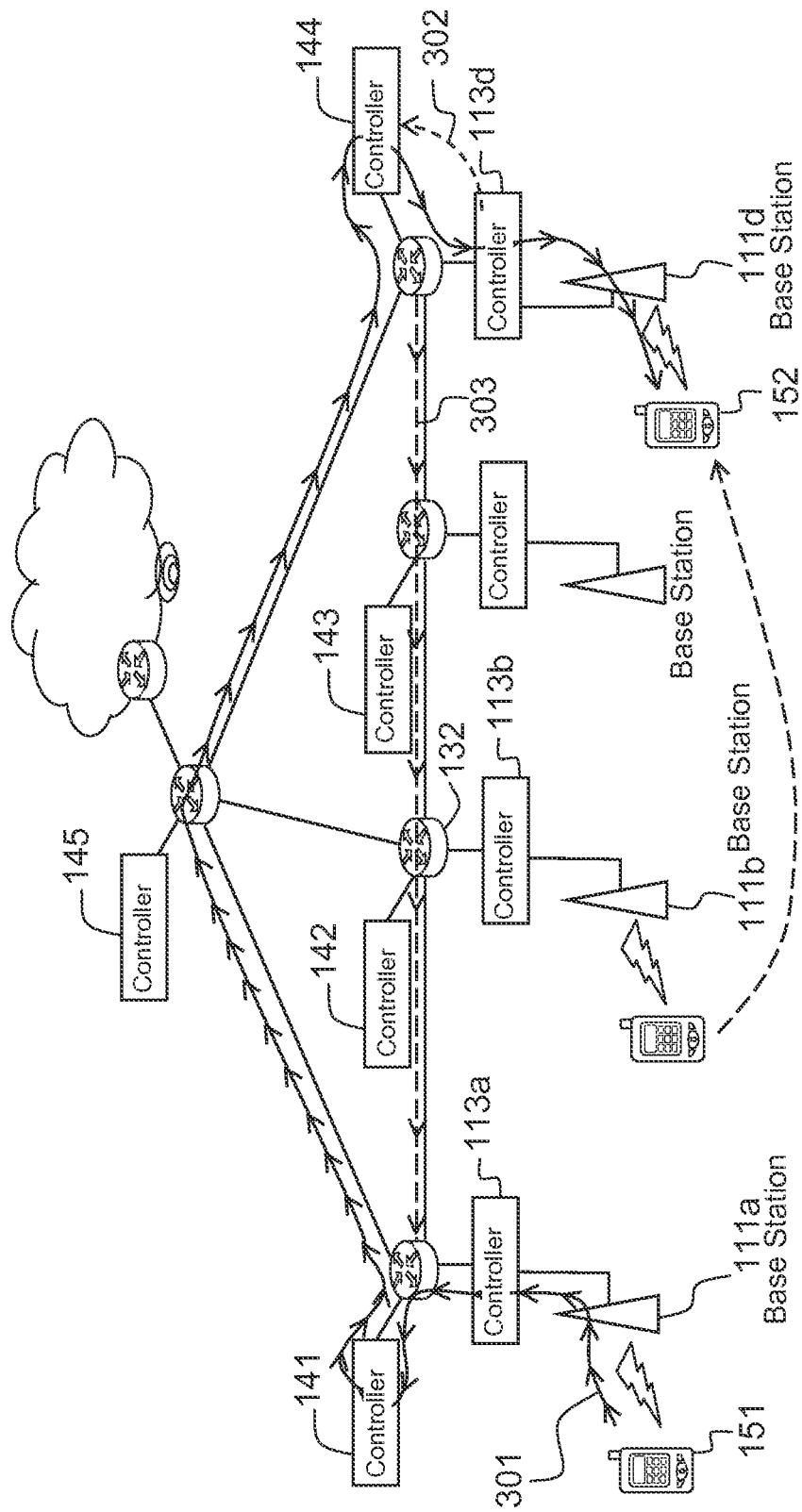
FIG. 3, an example of macro-mobility handled by virtue of the method according to the invention.

FIG. 3 illustrates an example of macro-mobility handled by virtue of the method according to the invention. The example of FIG. 3 again employs the network of FIG. 2, in which two mobile terminals 151, 152 communicate.

The second terminal 152 moves away from the base station 111b with which it was connected, until it connects to a base station 111d affiliated to a third controller 113d different from the previous controller. The second mobile terminal 152 is detected by the third controller 113d. A level-2 message 302 is sent by this third controller 113d to the gateway 144 with which it is associated, which gateway sends an IP message 303 (represented dashed in FIG. 3) destined for the other gateways 141, 142, 143 to advise them of the movement of the mobile terminal 152. The tables of correspondences maintained by the gateways 141, 142, 143 are updated, so that the IP packets intended for the mobile terminal 152 are properly conveyed to the gateway 144 associated with the new controller 113d to which the second mobile terminal 152 is affiliated.

The path 301 followed by data between the first mobile terminal 151 and the second mobile terminal 152 after macro-mobility is illustrated by an arrowed solid line.

If one or more communication links are cut, then the meshed character of the network and the fact that each gateway has direct access to the correspondences between IP addresses of the mobile terminals and IP addresses of the gateways with which they are affiliated makes it possible to ensure the conveying of the data correctly. The mobility management function is decentralized.

An advantage of the method according to the invention is that it makes it possible to reuse controllers initially designed to operate at level 2 of the ISO layer. It is thus possible to realize a reliable 4 G network on the basis of a level-3 interconnection network. The method according to the invention does not require the implementation of particular functionalities on the mobile terminals. Standard mobile terminals can therefore benefit from the invention. Finally, the method according to the invention is compatible with the conventional IP routing solutions and relies only on functions implemented in the controllers between the radio access network and the interconnection network.

The invention claimed is:

1. A method for guaranteeing continuity of communications operated from several fourth-generation mobile terminals connected to a radio network provided with several base stations with which each of said several fourth-generation mobile terminals is configured to communicate,
    wherein each said base station is connected to a controller from among several controllers linking said radio network to an interconnection network comprising routers operating at an IP layer level,
    wherein said controllers are connected to at least one gateway from among a plurality of gateways,
    wherein each of said plurality of gateways is connected to at least one of said routers,
    wherein each of said at least one gateway has at least two different IP addresses, of which a first IP address is known to the fourth-generation mobile terminals of the radio network and of which a second IP address is known to the routers of the interconnection network,
    wherein said first IP address is the same for all the plurality of gateways of the radio network, and
    wherein each fourth-generation mobile terminal is associated with at least one base station and with at least one gateway connected to the controller to which said at least one base station is connected,
the method comprising:
    establishing, for each of said plurality of gateways, a match list between the IP address of each fourth-generation mobile terminal connected to the radio network and said second IP address of said associated gateway by:
        transmitting, when a particular fourth-generation mobile terminal connects to a particular base station connected to a first controller to which the particular fourth-generation mobile terminal was not affiliated previously, a level-2 message comprising at least the IP address of the particular fourth-generation mobile terminal, said transmitting being carried out by the first controller or said associated gateway;
        creating, at said associated gateway, an IP message comprising the IP address of said particular fourth-generation mobile terminal and the second IP address of said associated gateway in the interconnection network; and
        broadcasting said IP message by said associated gateway to destination gateways associated with other controllers, wherein each of said destination gateways stores a correspondence between the IP address of the particular fourth-generation mobile terminal and the second IP address of the associated gateway that is carrying out said broadcasting associated with the controller to which the particular fourth-generation mobile terminal is affiliated; and
    routing IP packets in the interconnection network by:
        transmitting systematically all the IP packets arising from the controller to said associated gateway; and
        encapsulating, by said associated gateway, each of said IP packets in respective IP packets of a higher level using said match list, wherein a destination IP address of each of said higher level IP packets is the second IP address corresponding to a destination gateway, and wherein each fourth-generation mobile terminal has an IP address that does not change when said fourth-generation mobile terminal passes from the first controller to another controller.

2. The method according to claim 1, wherein each controller is
    connected to a respective gateway of the plurality of gateways that is dedicated to said each controller.

3. The method according to claim 2, in which each respective gateway of the plurality of gateways is connected to each respective controller by way of at least one IP router included in the interconnection network, wherein said IP router is configured to systematically guide all the IP packets or level-2 messages to said each of the plurality of gateways prior to the encapsulation of the IP packets and the broadcasting of the encapsulated IP packets in the interconnection network.

4. The method according to claim 3, further comprising:
    transmitting, after the encapsulation of the IP packets, all the encapsulated IP packets arising from a first gateway connected to a first controller that travel via the interconnection network to a second gateway connected to a second controller;

extracting, by the second gateway, IP packets from the higher level IP packets transmitted by the first gateway; and transmitting said extracted IP packets to the second controller.

5. The method according to claim 1, further comprising:

receiving, from one of said routers in the interconnection network, an ARP request from an external router outside the interconnection network;

rerouting said ARP request from the router in the interconnection network to a gateway in the plurality of gateways that has a level-2 address;

transmitting, from said gateway, a response to said external router, the response comprising the level-2 address.

6. A system for guaranteeing continuity of communications operated from several fourth-generation mobile terminals, the system comprising:

a radio network including a plurality of base stations with which said fourth-generation mobile terminals are configured to communicate;

an interconnection network comprising routers operating at an IP layer level;

a plurality of controllers, each of said base stations being connected to one of said plurality of controllers, said plurality of controllers linking said radio network to said interconnection network; and a plurality of gateways, wherein each of said controllers is connected to at least one gateway of said plurality of gateways, wherein each of said plurality of gateways receives IP packets arising from the radio network, wherein each of said plurality of gateways has at least two different IP addresses, of which a first IP address is known to the base stations of the radio network and of which a second IP address is known to the routers of the interconnection network, wherein said first IP address is the same for all gateways of said plurality of gateways of the radio network, wherein each fourth-generation mobile terminal is associated with at least one base station and with at least one gateway connected to the controller to which said at least one base station is connected, wherein each of said plurality of gateways establishes a match list between the IP address of each fourth-generation mobile terminal connected to the radio network and said second IP address of said associated gateway by:

transmitting, when a particular fourth-generation mobile terminal connects to a particular base station connected to a first controller to which the particular fourth-generation mobile terminal was not affiliated previously, a level-2 message comprising at least the IP address of the particular fourth-generation mobile terminal, said transmitting being carried out by the first controller or said associated gateway;

creating, at said associated gateway, an IP message comprising the IP address of said particular fourth-generation mobile terminal and the second IP address of said associated gateway in the interconnection network; and broadcasting said IP message by said associated gateway to destination gateways associated with other controllers, wherein each of said destination gateways stores a correspondence between the IP address of the particular fourth-generation mobile terminal and the second IP address of the associated gateway that is carrying out said broadcasting associated with the controller to which the particular fourth-generation mobile terminal is affiliated, and wherein the routers in the interconnection network route IP packets by:

transmitting systematically all the IP packets arising from the controller to said associated gateway, wherein each of said plurality of gateways encapsulates each of said IP packets in respective IP packets of a higher level using said match list, wherein a destination IP address of each of said higher level IP packets is the second IP address corresponding to a destination gateway, wherein each fourth-generation mobile terminal has an IP address that does not change when said each fourth-generation mobile terminal passes from the first controller to another controller, and wherein each of said plurality of gateways broadcasts said IP packets of the higher level over the interconnection network.

7. The system according to claim 6, wherein said at least one gateway is connected via a data bus to the controller with which it is associated.

8. The system according to claim 6, wherein said at least one gateway is connected by way of at least one router to the controller with which it is associated.

* * * * *